United States Patent
Eder et al.

(10) Patent No.: US 7,325,044 B2
(45) Date of Patent: Jan. 29, 2008

(54) METHOD FOR SETTING UP A PROGRAM-CONTROLLED CIRCUIT ARRANGEMENT AND CIRCUIT ARRANGEMENT FOR EXECUTION OF THE METHOD

(75) Inventors: Stefan Eder, Grafenau (DE); Gunther Fenzl, Neubiberg (DE)

(73) Assignee: Infineon Technologies AG, Munich (DE)

( * ) Notice: Subject to any disclaimer, the term of this patent is extended or adjusted under 35 U.S.C. 154(b) by 948 days.

(21) Appl. No.: 10/619,073

(22) Filed: Jul. 14, 2003

(65) Prior Publication Data

US 2005/0021932 A1    Jan. 27, 2005

(30) Foreign Application Priority Data

Jul. 12, 2002  (DE) ............................... 102 31 653

(51) Int. Cl.
*G06F 15/16* (2006.01)
*G06F 15/177* (2006.01)

(52) U.S. Cl. ...................... 709/219; 709/222; 709/250; 710/10; 716/1; 716/16

(58) Field of Classification Search ........ 709/217–219, 709/221–222, 250; 710/8–10; 716/1–2, 716/10, 15–16; 358/442–444
See application file for complete search history.

(56) References Cited

U.S. PATENT DOCUMENTS

| | | | |
|---|---|---|---|
| 5,305,457 A * | 4/1994 | Takida et al. ............... | 709/222 |
| 5,577,210 A | 11/1996 | Abdous et al. | |
| 6,145,095 A * | 11/2000 | Tattari ......................... | 714/16 |
| 6,219,780 B1 | 4/2001 | Lipasti | |
| 6,230,260 B1 | 5/2001 | Luick | |
| 6,260,090 B1 | 7/2001 | Fuhs et al. | |

(Continued)

FOREIGN PATENT DOCUMENTS

DE    69228413.3    11/1992

OTHER PUBLICATIONS

Cisco Digital IP Telephony Gateway: DT-24+ Data Sheet (online); Cisco Systems, Inc., 2000 (cisco.com/warp/public/cc/pd/ga/prodlit/dt24_ds.pdf).

*Primary Examiner*—Bharat Barot
(74) *Attorney, Agent, or Firm*—Jagtiani + Guttag

(57) ABSTRACT

In the case of devices with a program-controlled circuit arrangement operating program instructions are necessary for their operation. In order to reduce the storage space necessary for this, in the case of devices which have a connection to a data transmission network in any case, the operating program instructions are not held in the device, but loaded via the data transmission network. For this purpose the circuit arrangement has a start procedure memory, in which is stored a start procedure set up in such a way that for its execution a processor unit connects up via the data transmission network by means of the interface to an operating program server and from this loads operating program instructions into a main memory connected to the processor unit. The storage space required for the start procedure memory can be further reduced, if the start procedure embedded in it is set up so that the processor unit loads the instructions, which are necessary for connecting to the operating program server and for loading from this the operating program instructions, from a download procedure memory.

12 Claims, 1 Drawing Sheet

U.S. PATENT DOCUMENTS 6,335,966 B1 * 1/2002 Toyoda ....................... 358/442
6,356,942 B1 * 3/2002 Bengtsson et al. .......... 709/219
6,885,901 B2 * 4/2005 Tomii ......................... 709/223
7,017,162 B2 * 3/2006 Smith et al. ................ 719/328

* cited by examiner

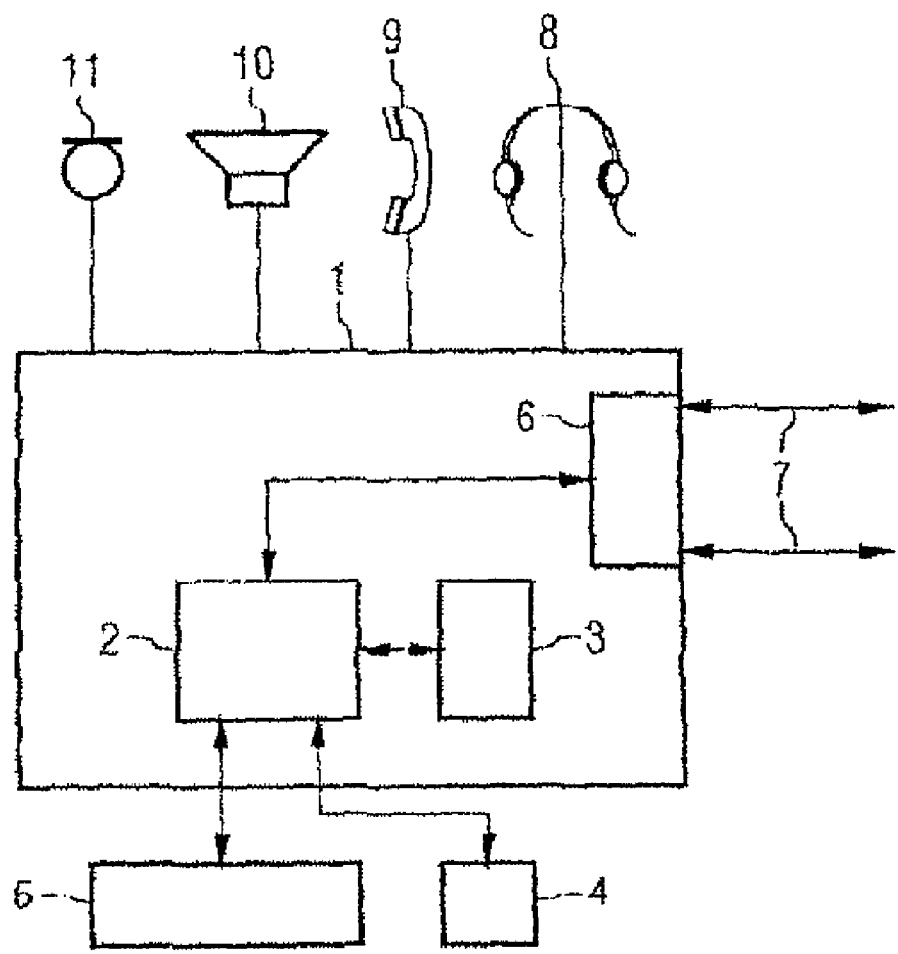

METHOD FOR SETTING UP A PROGRAM-CONTROLLED CIRCUIT ARRANGEMENT AND CIRCUIT ARRANGEMENT FOR EXECUTION OF THE METHOD

BACKGROUND

The present invention relates generally to a method for setting up a program-controlled circuit arrangement with a processor unit, an assigned non-volatile start procedure memory, a main memory and an interface for connection to a data transmission network as well as a circuit arrangement set up for execution of the method.

The term "program-controlled circuit arrangements" is understood to mean all devices, which need a program or operating program instructions for operation. Usually these are circuit arrangements with a microprocessor, a micro controller or circuit arrangements, which contain a microprocessor core. The prior art is to provide a memory within such circuit arrangements, in which the methods necessary for operation of the circuit arrangement are stored and to set up the processor unit in such a way that on start-up of the circuit arrangement the instructions are loaded and implemented by the processor unit, in order to move the circuit arrangement into a condition ready for use. Numerous devices in the field of entertainment electronics, in the field of household appliances and other small electrical equipment, in which the necessary functions can also be operated cost-effectively with a microprocessor or micro-controller, operate according to the aforementioned principle.

Even though the operating program instructions necessary for such applications are not particularly extensive, the memory to be provided in the circuit arrangements for storage of these instructions represents an additional complexity and cost factor. In addition an operating program embedded in the circuit arrangement has the disadvantage that updating or changing the operating program instructions requires direct intervention in the circuit arrangement.

SUMMARY OF THE INVENTION

One object of the present invention is to create a method for setting-up a program-controlled circuit arrangement as well as a circuit arrangement set up to carry out method, in which the complexity of the circuit arrangement can be reduced and greater flexibility can be achieved when setting up the circuit arrangement.

In one aspect of the invention, a method for setting up a program-controlled circuit arrangement with a processor unit, an assigned non-volatile start procedure memory and an interface for connection to a data transmission network is disclosed. The processor unit is set up in such a way that, after being switched on, it executes a start procedure stored in the start procedure memory. A start procedure is stored in the start procedure memory, wherein said start procedure is set up in such a way that during its execution the processor unit connects up by means of the interface to an operating program server and from this loads operating program instructions into a main memory assigned to the processor unit.

In another aspect of the invention, a circuit arrangement with a processor unit, an assigned non-volatile start procedure memory and an interface for connection to a data transmission network is disclosed. The processor unit is set up in such a way that it executes a start procedure stored in the start procedure memory after being switched on, wherein a start procedure is stored in the start procedure memory, wherein said start procedure is set up in such a way that during its execution the processor unit connects up by means of the interface to an operating program server and from this loads operating program instructions into a main memory assigned to the processor unit.

DETAILED DESCRIPTION

Generally, the invention exploits the fact that circuit arrangements with an interface for connection to a data transmission network can in any case receive data from the data transmission network. In this way the circuit arrangement can be set up with very little complexity in such a way that it receives the operating program instructions, which are necessary for operation of the circuit arrangement via the data transmission network. Although this requires an operating program server, which is set up accordingly, an overall cost saving results however when a sufficiently large number of circuit arrangements are supplied with operating program instructions via the data transmission network. Additionally there is now no longer any requirement to directly intervene in the circuit arrangement following a change in the operating mode of the circuit arrangement as a result of a change in the operating program instructions. In the case of several circuit arrangements of this type there is the additional advantage that, irrespective of the number of circuit arrangements, intervention, that is to say in the operating program server, is necessary only once.

In an advantageous development it can be proposed that the start procedure itself further does not contain the instructions for making connection via the data transmission network, but only those for loading a download procedure from a separate download procedure memory. In this case the processor unit would implement the start procedure from the start procedure memory and at the same time load and execute the download procedure from the download procedure memory and only thereupon make the connection by means of the interface via the data transmission network to the operating program server and load the operating program instructions into the main memory. The advantage here is that the start procedure memory can be smaller, since the instructions for downloading the operating program instructions are held in a separate memory. This in particular is the case where the start procedure memory is integrated together with the processor unit in a semiconductor and the intention is for the start procedure memory to be small. This may for example be for cost reasons, since the start procedure memory requires space according to its size on the common semiconductor and thus increases its costs.

If a separate download procedure memory is provided, this can be integrated together with the processor unit in a semiconductor, however the download procedure memory is implemented as a separate memory location for the download procedure advantageously as a separate semiconductor module, which in particular is a standard memory module. This in particular has a serial data output, so that only a few feeder lines are needed between the semiconductor with the processor unit and the download procedure memory. In particular the download procedure memory can be a serial EEPROM.

The present invention in principle is suitable for all devices with a program-controlled circuit arrangement, which necessarily due to their function have a connection to a data transmission network. This can for example be a telephone or fax apparatus, which transmits its data via a data transmission network. Such a service in the case of telephony data is also known as voice over IP. In principle however other applications would also be conceivable such as switches or hubs used in data transmission networks for example.

The function of the operating program server can be implemented in different ways. Usually data transmission networks are equipped with central processing units, which provide central services for subscribers connected to the data transmission network, such as for example file servers etc. A central processing unit of this kind can be set up by implementing suitable software in such a way that the circuit arrangements according to the invention are supplied with the operating program instructions after corresponding inquiry by the central processing unit.

The operating program server however can also be implemented as a separate unit, which is particularly coordinated with specific program-controlled circuit arrangements according to the present invention and can make contact with these without further adjustment. In the latter case circuit arrangements according to the present invention could be introduced into a computer network, without having to make changes to the computer network and computers or central processing units connected to it.

The invention is described in more detail below on the basis of a preferred embodiment with reference to the attached drawing. The only drawing shows a diagram of the structure of a circuit arrangement to provide a telephone service via a data transmission network.

The circuit arrangement 1 illustrated in FIG. 1 is a semiconductor for use in a telephone, which transmits speech signals via a data transmission network 7. For this purpose this circuit arrangement 1 set up for Voice over IP has interfaces for connection of necessary external components, such as headphones 8, a telephone receiver 9, a loudspeaker 10 and a microphone 11 and provides the usual features of performance for a telephone.

A processor unit 2 is integrated in the circuit arrangement 1 on a common semiconductor with an assigned start procedure memory 3. Furthermore the circuit arrangement 1 has a switch 6, which on the one hand serves as interface between the circuit arrangement 1 and a data transmission network 7 and on the other hand for transmitting packets in the data transmission network 7. The data transmission network 7 is an Ethernet, whereby with the two lines illustrated the circuit arrangement 1 is connected on the one hand to a personal computer, not illustrated, and on the other hand with the other subscribers of the data transmission network 7. In addition to the usual data packets, which are destined for the personal computer, telephony data packets, which are sent and received by the circuit arrangement 1, are transmitted via the data transmission network 7.

Besides however it is also conceivable that the circuit arrangement 1 is equipped with only one port or connection for connecting to the data transmission network, in order to receive or send telephony data packets. The personnel computer would be connected in such a case to the data transmission network via a separate line.

Further components, not illustrated, are contained within the circuit arrangement, which are necessary to provide the telephone service. The components are controlled in this case by the processor unit 2, which however needs an operating program for satisfactory operation. As is usual in the case of processor units, the processor unit 2 is set up in such a way that, after being switched on or after a RESET, it executes the start procedure stored in the start procedure memory 3. This start procedure is set up in such a way that the processor unit 2 loads a download procedure from an external download procedure memory 4, which is connected via a serial data link to the circuit arrangement 1 or the processor unit 2 in it. For this purpose the processor unit 2 loads the instructions to be executed next into a main memory 5, which is connected to the circuit arrangement 1. The main memory 5 is a synchronous dynamic RAM, which has the advantage that it permits short access times and provides high memory density at low cost.

Thus first the start procedure is loaded by the processor unit 2 from the start procedure memory 3 and then the download procedure from the download procedure memory 4 into the main memory and is executed from there.

The download procedure is set up so that the processor unit 2 connects up via the data transmission network 7 by means of the interface 6 to an operating program server, not illustrated, and from this loads the operating program instructions to the main memory 5. The operating program server is set up in such a way that it transmits the required operating program instructions via the data transmission network to the circuit arrangement 1 on a corresponding request of the circuit arrangement 1. The operating program instructions transmitted by the operating program server are set up so that once loaded into the main memory 5, they move the circuit arrangement 1 into a condition ready for use. For this purpose the operating program instructions have all the functions which are necessary for operation of the circuit arrangement or the telephone.

With the aid of the solution according to the invention, in the case of a telephone, which sends or receives speech signals via a data transmission network 7, the memory provided in the telephone for operating program instructions can be made substantially smaller. Additionally in this way updating or changing the operating program instructions for example to implement a new functional feature is considerably simplified, since such a change does not need to be made on the telephone itself, but can be stored centrally by the operating program server. In this way changes in the operating program instructions, which are stored on the operating program server, affect several and in particular all telephones, which are set up in accordance with the present invention.

While various embodiments of the present invention have been described above, it should be understood that they have been presented by way of example only, and not limitation. For example, the phase-delay device disclosed in the above description can be implemented in hardware, software, or any combination thereof. Thus, the breadth and scope of the present invention should not be limited by any of the above-described exemplary embodiments, but should be defined only in accordance with the following claims and their equivalents.

What is claimed is:

1. A method for setting up a program-controlled circuit arrangement with a processor unit, an assigned non-volatile start procedure memory and an interface for connection to a data transmission network, whereby the processor unit is set up in such a way that, after being switched on, it executes a start procedure stored in the start procedure memory, wherein a start procedure is stored in the start procedure memory, wherein the start procedure is set up in such a way that during its execution the processor unit connects up by means of the interface to an operating program server and from this loads operating program instructions into a main memory assigned to the processor unit; wherein the start procedure is set up in such a way that during its execution the processor unit loads and executes a download procedure from a non-volatile download procedure memory into the main memory, and the download procedure is set up in such a way that during its execution the processor unit connects up by means of the interface to the operating program server and from this loads operating program instructions into the main memory assigned to the processor unit; and wherein the main memory storing the download procedure is separate from the start procedure memory but part of the programmed-controlled circuit.

2. The method of claim 1, wherein the circuit arrangement has an exchange arrangement for exchanging data packets within the data transmission network.

3. The method of claim 1, wherein the circuit arrangement is a circuit for providing a telephone and/or fax service via the data transmission network.

4. The method of claim 1, wherein the start procedure memory is integrated with the processor unit on a semiconductor module.

5. The method of claim 1, wherein the download procedure memory and the processor unit are integrated in various semiconductor modules and the download procedure is loaded serially from the download procedure memory.

6. The method of claim 5, wherein the download procedure memory (4) is a serial EEPROM.

7. A circuit arrangement with a processor unit, an assigned non-volatile start procedure memory and an interface for connection to a data transmission network, whereby the processor unit is set up in such a way that it executes a start procedure stored in the start procedure memory after being switched on, wherein a start procedure is stored in the start procedure memory, wherein the start procedure is set up in such a way that during its execution the processor unit connects up by means of the interface to an operating program server and from this loads operating program instructions into a main memory assigned to the processor unit; wherein the start procedure is set up in such a way that during its execution the processor unit loads and executes a download procedure from a non-volatile download memory, which is connected to the processor unit, into the main memory, whereby the download procedure is set up in such a way that during its execution the processor unit connects up by means of the interface to the operating program server and from this loads operating program instructions into the main memory assigned to the processor unit; and wherein the main memory storing the download procedure is separate from the start procedure memory but part of the programmed-controlled circuit.

8. The circuit arrangement of claim 7, wherein the circuit arrangement has an exchange arrangement for exchanging data packets within the data transmission network.

9. The circuit arrangement of claim 7, wherein the circuit arrangement is a circuit for providing a telephone and/or fax service via the data transmission network.

10. The circuit arrangement of claim 7, wherein the start procedure memory is integrated with the processor unit on a semiconductor module.

11. The circuit arrangement of claim 7, wherein the download procedure memory and the processor unit are integrated in various semiconductor modules and the download procedure memory has a serial output for the download procedure.

12. The circuit arrangement of claim 11, wherein the download procedure memory is a serial EEPROM.

* * * * *